Aug. 12, 1952     A. T. PHILLIPS     2,606,693
FILLING MACHINE
Filed Sept. 8, 1949     2 SHEETS—SHEET 1
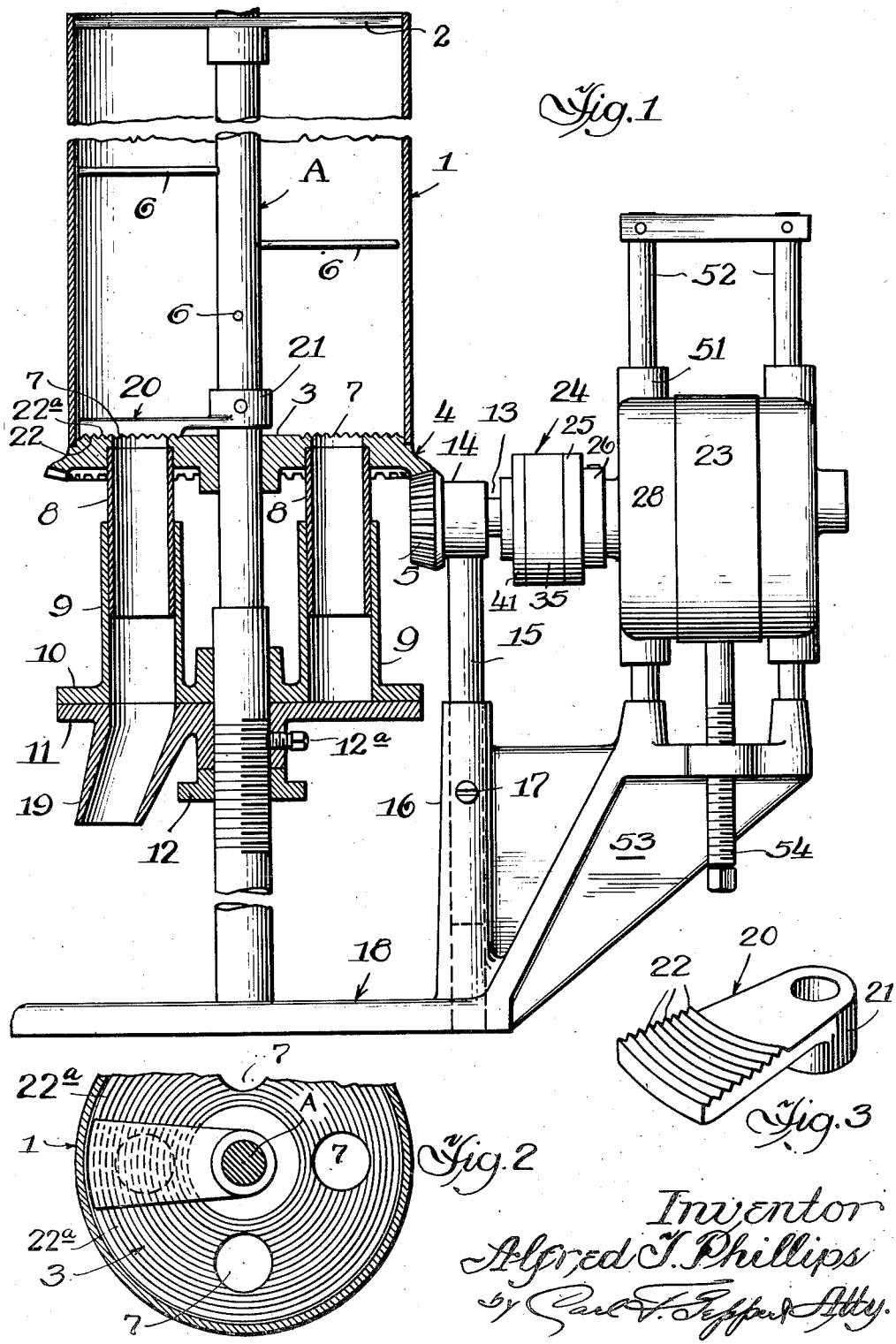
Inventor
Alfred T. Phillips Aug. 12, 1952   A. T. PHILLIPS   2,606,693
FILLING MACHINE
Filed Sept. 8, 1949   2 SHEETS—SHEET 2
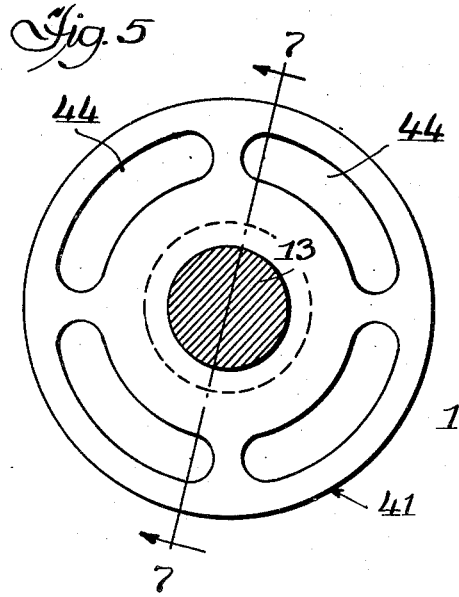
Fig. 5
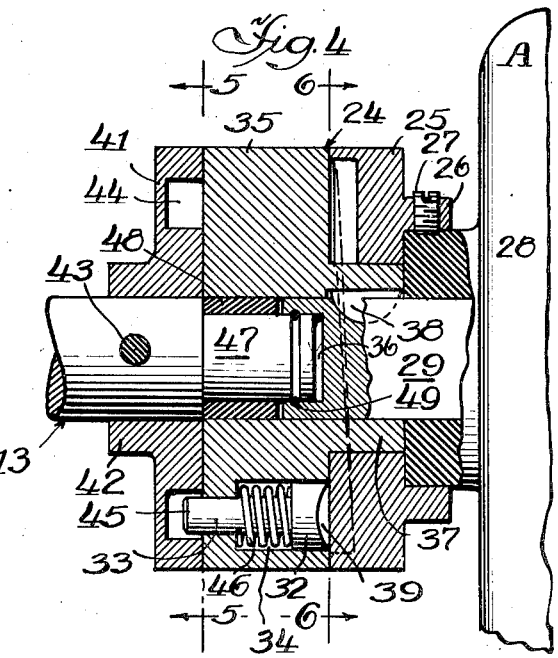
Fig. 4
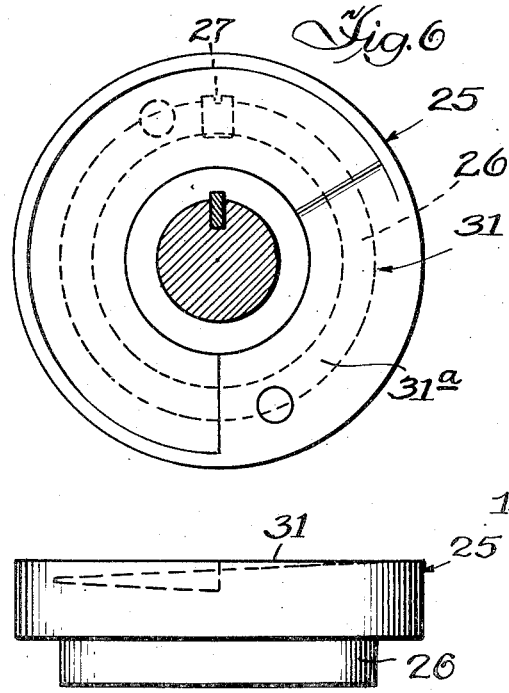
Fig. 6
Fig. 7
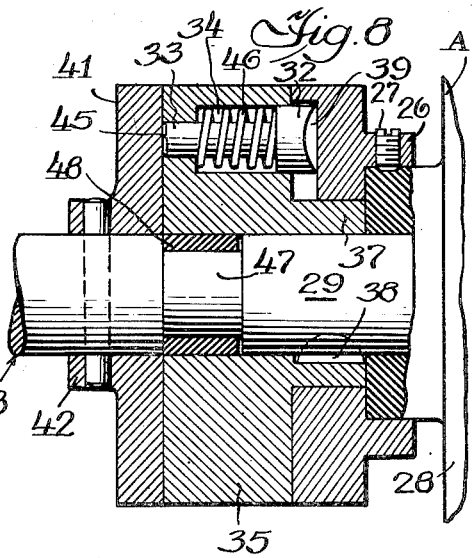
Fig. 8
Inventor
Alfred T. Phillips
by Carl F. Geppert Atty Patented Aug. 12, 1952

2,606,693

UNITED STATES PATENT OFFICE 2,606,693

FILLING MACHINE

Alfred T. Phillips, Chicago, Ill., assignor to National Packaging Machinery Repair Co., Chicago, Ill., a corporation of Illinois Application September 8, 1949, Serial No. 114,644

6 Claims. (Cl. 222—168)

1

The present invention relates to filling machines and more particularly to a novel means and mechanism for dispensing many and varied products or materials including sugar, coffee, spices, powders of all kinds, flaky materials, grains, nuts, etc., and, in fact, any products of a substantially dry nature that may be made to flow through a hopper and orifice.

It is, therefore, an object of the present invention to provide a novel mechanism for dispensing and filling packages of any products of a relatively dry nature which are capable of being packaged.

A further object of the present invention is the provision of a novel filling apparatus or mechanism for accurately and economically filling packages, and in which a plurality of filling cup units are simultaneously filled from the hopper so as to more efficiently and quickly fill packages with the dispensed products or materials.

The present invention further comprehends the provision of a novel filling machine that is so designed and constructed as to be readily and accurately adjustable to fill various types and sizes of packages or containers.

Another important object of the present invention is the provision of a novel filling machine assembly in which the hopper is made to rotate about a center post or shaft, and the latter carrying agitating means for maintaining a free flow or passage through the hopper of materials or products that may be sluggish or have a tendency to pack.

The invention further comprehends a novel intermittent drive mechanism for filling machines of the type provided with plural filling cups uniformly spaced apart and brought into registry with a discharge port and spout for successively discharging the measured products from the filling or measuring cups into packages provided therefor.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

2

In the drawings:

Figure 1 is a view, part in vertical cross-section and part in front elevation, of the novel filling machine and the operating mechanism therefor.

Fig. 2 is a fragmentary view in horizontal cross-section through the hopper or container and center post directly above the closure member overlying the filler cup unit being discharged.

Fig. 3 is a perspective view of the closure member but inverted from its normal operative position.

Fig. 4 is a vertical cross-sectional view of the intermittent drive unit shown in Fig. 1.

Fig. 5 is a view in vertical cross-section taken in a plane represented by the line 5—5 of Fig. 4, and showing the operating face of the rotating disc of the intermittent drive assembly.

Fig. 6 is a view in vertical cross-section taken in a plane represented by the line 6—6 of Fig. 4, and showing the cam face of the stationary disc or plate of the intermittent drive assembly.

Fig. 7 is a view in end elevation of the stationary disc or plate.

Fig. 8 is a cross-sectional view similar to Fig. 4 but with the rotatable parts rotated through an arc of 180° from the position of Fig. 4.

Referring more particularly to the disclosure in the drawings and to the embodiment therein selected to illustrate the present novel invention, Figs. 1, 2 and 3 disclose the novel filling machine or apparatus comprising a cylindrical container or hopper 1 having a cross-bar or member 2 mounted on a stationary center post or shaft A and a base plate 3 formed to provide a bevel gear 4 at its lower edge or periphery in meshing engagement with and driven by a bevel gear 5.

The hopper 1 with its base plate 3 is rotated at a desired and predetermined speed about the center post A upon which are mounted a plurality of agitating arms or projections 6 for agitating and maintaining free flow through the hopper, particularly of products or materials of a sluggish nature. These products are dispensed from the hopper through a plurality of accurately and uniformly spaced openings or discharge ports 7, with each port opening and emptying into a depending tube 8 secured to and carried by the base plate 3. Each of these tubes is in turn telescopically received in an upstanding filling cup 9 carried by a disc-like member 10 rotatable upon and in contact with a plate 11 secured to the stationary center post A.

To permit adjustment of the telescoping filling cup assembly consisting of the depending tubes 8 and the concentric filling cups 9, the combined capacity of which determines the quantity of the products to be dispensed, the plate 11 is adjustable vertically upon the shaft or center post A. This may be accomplished by threading this shaft or post for a portion of its length and providing it with a threaded locking collar 12 adjustable thereon. In addition, a set screw 12ª helps to maintain the plate 11 in fixed position.

The drive shaft 13 carrying the bevel gear 5 is journalled in a bearing sleeve 14 supported at the upper end of an adjustable bearing post 15 received in a hollow support 16 and adjustable vertically therein. A set screw, pin or other securing means 17 is adapted to lock or retain the bearing post in a desired vertical position in the supporting frame or base 18.

As the hopper and its base plate 3 are rotated, any product suitable for dispensing from the present novel filling machine and contained in the hopper, empties through the discharge ports 7 into the spaced depending tubes 8 and filling cups 9 until each filling cup unit between the base plate 3 and the stationary plate 11 is filled to capacity with the product to be dispensed. These filling cup units are all open to the hopper until one of them is in alignment with a discharge spout 19 depending from the stationary plate 11. At such time a radially projecting closure member or segment 20 having its collar 21 pinned or secured to the stationary shaft or center post overlies the port 7 to a filling cup unit then in registry or alignment with the spout to thereby prevent passage into this unit from the hopper of the product or material to be dispensed.

To prevent packing of the product or material on the base plate and to assure accuracy in dispensing successive predetermined or desired quantities of this product, the underside of the segment or closure member 20 is provided with arcuate corrugations or undulations 22 projecting to or closely adjacent the upper surface of the base plate 3. Concentric corrugations or undulations 22ª are preferably also provided on the adjacent, upper surface of the base plate 3.

To intermittently rotate the drive shaft 13 and the hopper 1 and its base plate 3 through the bevel gears 5 and 4 from a motor or other power source 23, there is provided a novel intermittent drive assembly 24 shown more clearly in Figs. 4 to 8 inclusive. It comprises a stationary disc or plate 25 having a peripheral flange 26 pinned or secured at 27 to the housing 28 of the motor and spaced radially outward from the motor shaft 29. This disc 25 is provided with a tapering cam surface 31, the contour of which is shown in Figs. 6 and 7, and against which surface rides the head or enlargement 32 of a spring-pressed clutch pin 33 carried in a recess 34 of a center disc 35.

This center disc 35 encompasses the recessed outer end 36 of the motor shaft 29 and is provided with an integral collar 37 disposed between this shaft and the end disc or plate 25 and keyed at 38 to this shaft so that the disc 35 rotates therewith and carries along the depending locking or clutch pin 33 with the rounded end 39 of the head or enlargement 32 riding over and maintained in contact with the cam surface 31.

An end disc 41 has its hub 42 pinned or otherwise secured at 43 to the driven shaft 13 for rotating the bevel gear 5. This disc is formed or provided with spaced arcuate recesses 44 any one of which is adapted to receive the projecting end 45 of the pin 33 whenever the enlarged end or head 32 thereof is depressed or moved to the left in Figs. 4 and 8 and against the action of the coil spring 46, by the dwell 31ª of the cam surface 31, the spring 46 maintaining this head against this cam surface 31 on the stationary or fixed end disc 25. As more clearly shown in Figs. 4 and 8, the shaft 13 has its end 47 reduced and rotatably received in a sleeve bearing 48 press-fitted in the bore of the center disc 35, and with its extreme end journalled in the recessed outer end 36 of the motor shaft and held against longitudinal movement therein by a split ring 49.

The intermittent rotation and the arc of travel of the driven shaft 13 through the novel intermittent drive assembly is such as to move the hopper 1 through an arc or angle of 90° for each revolution of the driven shaft 13, and permit sufficient dwell or the elapse of sufficient time to permit discharge of the contents of the telescoping filling unit before the succeeding unit is moved over the stationary plate 11 and brought into registry with the opening in the discharge spout 19.

If desired, the position of the motor may be adjusted, in which event it is mounted upon a supporting base 51 vertically adjustable and slidable upon spaced guide rods 52 mounted in a supporting bracket 53 carried by the base or frame 18. An adjusting screw 54 threaded in the bracket 53 and having one end secured to the base 51 for the motor, permits bodily adjustment of the motor by turning of the adjusting screw which raises or lowers the motor and its associated drive mechanism.

Having thus disclosed the invention, I claim:

1. A filling machine for filling packages from the contents of a hopper, comprising a rotatable hopper having an intermittently rotating base provided with spaced ports, a stationary center post for supporting and about which the hopper is adapted to rotate, filler cup units aligned with the ports and rotatable with the hopper, a stationary discharging and dispensing spout adjustably mounted on the center post, means for intermittently and progressively moving the hopper and filler cup units through a predetermined arc of travel to move successive units into alignment with the discharge spout for dispensing and packaging a predetermined quantity of the contents of the hopper, and a closure for overlying the discharge port to the unit which is brought into alignment with the spout whereby to close said unit to the hopper during dispensing and filling.

2. A machine for successively dispensing and filling packages with a predetermined quantity of a product from a hopper, comprising a hopper, a rotatable base plate at the bottom of the hopper supporting and carrying the hopper therewith and provided with a plurality of uniformly spaced ports, a telescoping and adjustable filling cup unit for each port and rotatable with the base plate, a stationary plate member disposed below the hopper and filler cup units and adjustable vertically, said member being provided with an opening and a dispensing spout with which each of said units is moved into registry as the base plate and its filler cup units are intermittently and progressively moved to bring successive units into registry with the spout, and means for causing such intermittent and progressive movement in predetermined timed relation.

3. A machine for successively dispensing and filling packages with a predetermined quantity of a bulk product from a receptacle, comprising a rotatable hopper having a rotatable bottom provided with a plurality of uniformly spaced ports, a stationary base member disposed beneath and in spaced relation with the bottom of the hopper and having a discharge port, means for vertically adjusting the stationary base member, telescoping filling cups depending from the bottom of the hopper and rotatable therewith, the lower end of the filling cups seating upon the stationary base member and each cup being adapted to be successively and progressively moved into alignment with the discharge port, drive mechanism for intermittently and progressively rotating the hopper and cups through an arc sufficient to move a succeeding cup into alignment with the discharge port, the ports in the bottom of the hopper being normally open to said filling cups, and a closure so positioned in the hopper that as the hopper and cups are rotated to bring a cup in alignment with and discharge its contents through the discharge port, said closure prevents access to said last mentioned cup.

4. A filling machine for filling packages from the contents of a hopper, comprising a rotatable hopper having a base provided with spaced ports, a stationary center post for supporting and about which the hopper is adapted to rotate, a telescoping and adjustable filling cup unit for each port and rotatable with the hopper, a plate member fixed to the stationary center post and disposed below the hopper and filler cup units and provided with an opening and a dispensing spout with which each of said units is moved into registry as the base and its filler cup units are intermittently and progressively moved through successive arcs to bring successive units into registry with the spout, means for adjusting said plate member on the center post to adjust the capacity of the filler cup units, and means for causing such intermittent and progressive movement in predetermined timed relation.

5. In a filling machine for packaging bulk products of a solid nature, a receptacle for the products and having a plurality of spaced openings provided in the bottom thereof, a stationary center post projecting through and supporting the receptacle, agitating means carried by the center post, a plurality of telescoping filling and measuring cups disposed beneath and depending from the bottom of the receptacle, a plate member adjustably mounted upon the center post beneath the cups and in spaced relation with the bottom of the receptacle and provided with a discharge spout, said plate member supporting said cups thereabove and vertically adjustable to permit adjustment of the telescoping cups, and an intermittently operating drive unit for intermittently and progressively rotating the receptacle and filling and measuring cups through an arc about the center post and over the plate member such as to bring successive cups into registry with the discharge spout.

6. In a filling and packaging machine in which a plurality of filling and measuring cups are intermittently and progressively rotated into alignment with a discharge spout for dispensing and packaging a measured quantity of a bulk product, a power drive unit therefor comprising a continuously rotating drive shaft, a driven shaft, and means for intermittently and progressively rotating the driven shaft through successive and predetermined arcs of travel, said means including a stationary plate having a cam face, a disc secured to the drive shaft and continuously rotated thereby, a pin carried in the disc and having one end spring-pressed against the cam face, and a plate secured to the driven shaft and having one or more arcuate recesses for receiving the other end of the pin and coupling the last mentioned plate and drive shaft to the disc through a predetermined arc of travel for each rotation of the drive shaft.

ALFRED T. PHILLIPS.

REFERENCES CITED

The following references are of record in the file of this patent:

UNITED STATES PATENTS

| Number | Name | Date |
|---|---|---|
| 753,729 | Oates | Mar. 1, 1904 |
| 1,001,855 | Jagenberg | Aug. 29, 1911 |
| 1,184,074 | Clark | May 23, 1916 |
| 1,453,840 | Holmquist | May 1, 1923 |
| 1,973,566 | Hanson | Sept. 11, 1939 |